United States Patent [19]

Yamazaki et al.

[11] Patent Number: 4,919,633
[45] Date of Patent: Apr. 24, 1990

[54] LIQUID CRYSTAL DEVICE WITH A FERROELECTRIC FILM AND METHOD FOR MANUFACTURING THE SAME

[75] Inventors: Shumpei Yamazaki, Tokyo; Masashiko Sato, Atsugi; Hiroyuki Sakayori, Machida, Japan

[73] Assignee: Semiconductor Energy Laboratory Co., Ltd., Kanagawa, Japan

[21] Appl. No.: 184,009

[22] Filed: Apr. 20, 1988

Related U.S. Application Data

[62] Division of Ser. No. 94,872, Sep. 10, 1987.

[30] Foreign Application Priority Data

Sep. 19, 1986 [JP] Japan .................. 61-221180
Dec. 2, 1986 [JP] Japan .................. 61-288527

[51] Int. Cl.⁵ ............................................. H01J 9/00
[52] U.S. Cl. ................................. 445/24; 427/240; 427/26
[58] Field of Search ................. 445/24; 427/26, 240

[56] References Cited

U.S. PATENT DOCUMENTS

| | | | |
|---|---|---|---|
| 3,725,899 | 4/1973 | Greubel | 350/160 LC |
| 4,040,720 | 8/1977 | York | 350/333 |
| 4,052,519 | 10/1977 | Prazak, III | 427/240 |
| 4,563,059 | 1/1986 | Clark | 350/350 S |
| 4,687,825 | 8/1987 | Sagou | 427/240 |
| 4,714,323 | 12/1987 | Katagiri | 350/350 S |

FOREIGN PATENT DOCUMENTS 2211460 3/1972 Fed. Rep. of Germany ........ 427/26
0132793 10/1979 Japan .................................. 445/24

Primary Examiner—Kurt Rowan
Attorney, Agent, or Firm—Gerald J. Ferguson, Jr.

[57] ABSTRACT

An improved liquid crystal device is described such as a display. The device comprises a pair of substrates, a liquid crystal layer, an electrode arrangement, and a ferroelectric film. The ferroelectric film is formed on the inside of the substrate by spinning method using a mixture of a ferroelectric material and an organic resin. When coating, the mixture is diluted with a solvent so that the ferroelectric film can be formed as a thin film. In advance of curring, the ferroelectric film is subjected to an electric field and its dipole moment is aligned and fixed in a direction perpendicular to the substrate. In virtue of the dipole moment, the liquid crystal device can be controlled by applying a voltage in one direction with a high stability.

5 Claims, 3 Drawing Sheets

LIQUID CRYSTAL DEVICE WITH A FERROELECTRIC FILM AND METHOD FOR MANUFACTURING THE SAME

This is a division application Ser. No. 094,872 filed Sept. 10, 1987 now allowed.

BACKGROUND OF THE INVENTION

This invention relates to liquid crystal device with a ferroelectric film and its manufacturing method.

In prior art, a liquid crystal device using a ferroelectric chiral smectic liquid crystal (FLC) comprises a pair of transparent substrates, a liquid crystal layer disposed between the substrates, an electrode arrangement in the form of pixels to apply electric field to the liquid crystal layer, and a polarizing plate provided on the disc. The liquid crystal layer changes its optical characteristics in accordance with the direction of electric field perpendicularly applied to pixels. With the polarizing plate and the anisotoropic absorption by the liquid crystal layer whose anisotropic direction is changed in accordance with the direction of the applied electric field, the transparency of each pixel of the liquid crystal device can be controlled by applying an electric field of a suitable direction to the pixel. As a driving method for such a liquid crystal device, "AC driving method" is well-known in the art. According to this method, in advance of applying a electric field to a particular pixel to turn the dipole moment of liquid crystal at the pixel, a weak electric field is applied in the opposed direction with a finely controlled duration and strength.

The liquid crystal layer used in such a liquid crystal device exhibits an apparent hysteresis. Namely, the optical characteristics of the liquid crystal can be kept even after removal of an applied electric field, until an opposed electric field stronger than a certain level, i.e., called a coersive electric field (Ec is applied. Nonetheless, the liquid crystal itself does not have inherent hysteresis. The apparent hysteresis can be understood by taking into consideration the interaction between the inside surfaces of the substrates and the liquid crystal. From this mechanism, such a liquid crystal layer is called SSFLC (Surface Stabilized Ferroelectric Liquid Crystal). However, the Ec is faint so that the driving method of a liquid crystal device becomes complex, and that it is difficult to produce a grey scale.

SUMMARY OF THE INVENTION

It is therefore an object of the invention to provide a liquid crystal device capable of a stabilized operation and its manufacturing method.

It is another object of the invention to provide a liquid crystal device which can be driven by applying a voltage only in one direction.

DETAILED DESCRIPTION OF THE PREFERRED EMBODIMENTS

Figure 1:
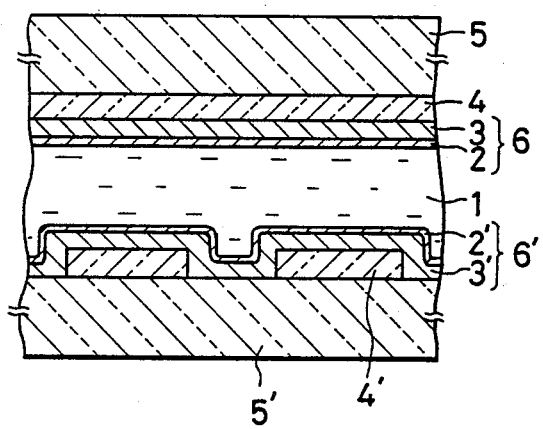
FIG. 1 is a cross section view of a liquid crystal device in accordance with the present invention.

Referring to FIG.1, a liquid crsytal device in accordance with the invention is illustrated. In the figure, the liquid crystal device, such as a display, comprises a pair of transparent substrates 5 and 5', a plurality of first electrode strips 4 formed on the substrate 5 and extending in the lateral direction, a plurality of second electrode strips 4' formed on the substrate 5' and extending in the direction normal to the drawing sheet, ferroelectric layers 3 and 3' and oriented films 2 and 2' provided on the substrates 5 and 5', and a ferroelectric chiral smectic liquid crystal layer 1. The substrate 5' can be opaque when the electrode strips 4' are made reflective.

Figure 2A:
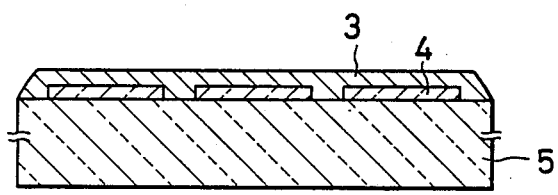
FIGS. 2(A) to 2(C) are section view showing a manufacturing process in accordance with the present invention.
Figure 2B:
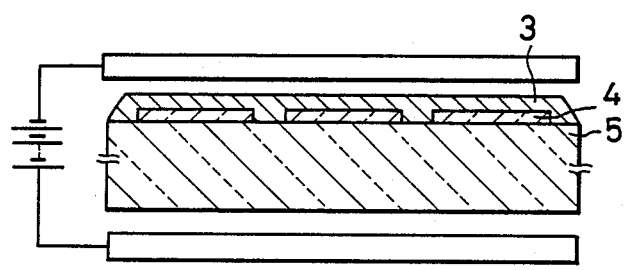
Figure 2C:
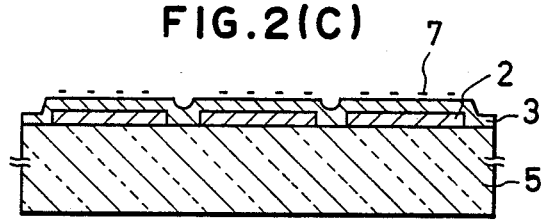

With reference to FIGS.2(A) to 2(C), how the ferroelectric layers 3 and 3' are formed on the substrates is explained. After cleaning the inside of the glass substrate 5 on which the first electrode strips 4 are formed, a ferroelectric layer 3 is applied on the inside of the substrate by spining method. The ferroelectric material to be applied is prepared by diluting a ferroelectric liquid crystal or a copolymer with methyl-ethyl-ketone at 10% weight to form a thin film on the substrate, and blending with a polyimide resin or a polyvinylalcohol. The copolimer is made, for example, from vinylidenefloride (called VDF, $(CH_2CF_2)n$), and trifloroethylene (called TrFE) by polymerization. The thickness of the layers 3 and 3' is controlled less than 5000 Å e.g., 200 tp 300 Å by adjusting the density of the solution and the spining rotation number.

The ferroelectric layer is prebaked at 70° C. to remove the solvent(methylethylketone). Then, the substrate 5 is disposed between a pair of electrodes and subjected to a high electric field by applying 20 to 100 V, e.g., 50 V as shown in FIG. 2(B). Upon polarizing the ferroelectric layer by the application of electric field, the ferroelectric layer is cured at 350° C. for an hour to fix the dipole of the layer 3 and remove unnecessary remaining solvent by vaporization. The curing condition depends on the resin. By this process the ferroelectric layer comes to possess surface charge 7 on its inside (FIG. 2(C)). The surface charge can be controlled in its amount and the sense by changing the amount of ferroelectric material mixed with a polyimide resin and the strength and the direction of the applied electric field. Namely, when assembled with this substrate, the dipole of a liquid crystal layer 1 (FIG. 1) is controlled in the light of the charge appeared on a film adjacent thereto. This configuration is called FCS (Fixed Charge Stabilized) method. The solvent of methyl-ethtyl-ketone may be dispensed with. In this case, prebaking step is unnecessary.

On the inside of the ferroelectric layer 3, a very thin polyimide film is formed and given rubbing treatment to produce a topographically textured tilt alignment surface. However, on the inside of the other substrate 5' no orientation treatment is given while a thin polyimide film is also formed thereon without rubbing treatment.

Next, a liquid crystal is disposed by means of a conventional method between the substrates whose periphery is sealed off. The liquid crystal is a ferroelectric liquid crystal, e.g., a blend of an ester liquid crystal and a biphenyl liquid crystal, or such as described in Japanese patent disclosures Nos. sho 56,107,216, 59-98,051, and 59-118,744.

Figure 3A:
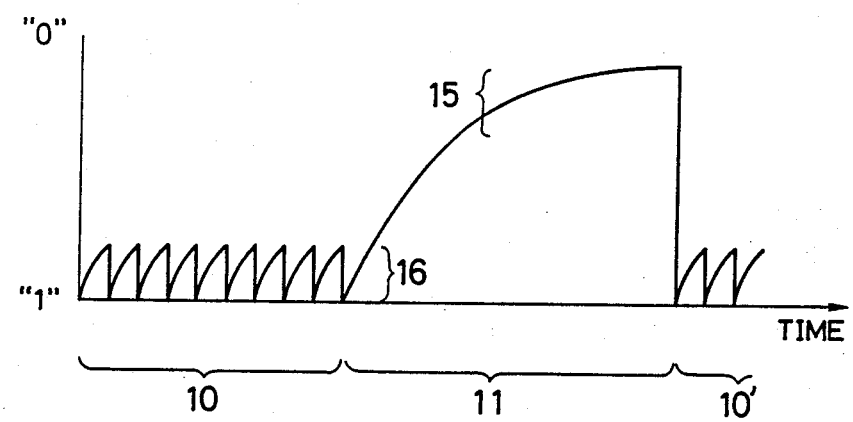
FIGS. 3(A) and 3(B) are graphical views showing the response of a liquid crystal device to applied voltage in accordance with the present invention.
Figure 3B:
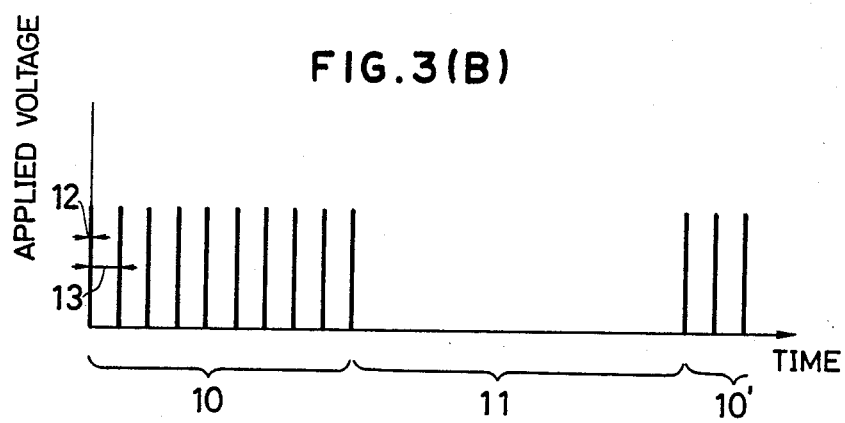

In accordance with the present invention, a liquid crystal device was formed with a polarizing plate and a plurality of pixels in the form of a 2 ×2 matrix with a pair of electrodes of 1 mm×1 mm for each pixel. When no external voltage was applied to the electrodes, the liquid crystal device was opaque. When 20 V was applied to a pixel in the direction opposite to the direction of the dipole moment of the ferroelectric layers 3 and 3', the pixel became transparent while the other pixels remained opaque. Namely, the liquid crystal device could be controlled by whether a voltage was applied or not. Of course, whether a pixel is transparent or not, when voltage is applied, depends on the arranging direction of the polarizing plate with reference to the anisotropy of liquid crystal. FIGS. 3(A) and 3(B) are graphical diagrams showing the realtionship between the applied voltage and the transparency of the liquid crystal device. The diagram has been plotted by means of a photo multiplier which receive the light passing through the liquid crystal device. In FIG. 3(A) the ordinate is transparency indicated in the range between the "0" level (transparent) and the "1" level (opaque). In FIG. 3(B), the ordinate is the voltage applied to the electrode strips for pixel of the liquid crystal device. In both FIGS. 3(A) and 3(B) the abscissa is common time. In response to a voltage applied at time 0, the liquid crystal device exhibits transparent condition. This transparency is gradually reduced after removing the applied voltage. However, when pulsed voltage is applied to an opaque pixel, the pixel quickly becomes transparent. This was observed repeatedly in response to 20 V pulses with 83 microseconds in pulse width applied at an interval of 17 mili seconds, as know in the region 10 of FIGS. 3(A) and 3(B). The region 10 indicates that the transparent condition of the liquid crystal device can be achieved also by applying alternative voltage instead of a direct voltage, because the liquid crystal device changesonly gradually from a transparent state to an opaque state, as shown in the region 11 of FIGS. 3(A) and 3(B). If more quick change from a transparent state to an opaque is desired, a slight opposite voltage may be applied.

The system is characterized also in that a voltage is applied to the device only in one direction, so that crosstalking is limited even in the case of a liquid crystal device having 720 ×480 pixels. Generally speaking, such a ferroelectric film is unstable and easy to be dissolve or decomposed. However, in accordance with the invention, the ferroelectric film is formed with an organic resin so that a very stable operation condiction can be accomplished.

The invention should not limited to the above particular embodiment and many modifications and variations may cause to those skilled in the art. Although the ferroelectric layer 3 is made of a blend of a ferroelectric material and a polyimide by spining, the ferroelectric material may be blended with other organic resin such as a nylon and, in place of spining, other forming methods can be used, such as sputtering, a DIP method, a screen press printing and so forth. Further, the ferroelectric film 3 itself can be an oriented film contiguous to the inside of the substrate, without providing the special oriented film 3. The ferroelectric film may be formed only on the electrodes of pixels instead of forming over all the inside surfaces of the substrates. The invention may be applied for speakers, shatters having image sensor

We claim:

1. A method of manufacturing a liquid crystal device comprising: preparing a substrate;
   coating said substrate with a ferroelectric material film consisting of a mixture of a ferroelectric material and a organic resin;
   applying an electric field to said ferroelectric film in a direction perpendicular to said substrate;
   curing said ferroelectric film;
   mating said substrate with an opposite substrate; and
   disposing a liquid crystal layer between said substrates.

2. The method of claim 1 further comprising a step of forming an electrode arrangement for said substrates.

3. The method of claim 2 wherein said coating step is carried out by diluting said ferroelectric material and said organic resin with a solvent, applying the same on said substrate in the form of a thin film, and baking said thin film in order to remove said solvent.

4. The method of claim 2 wherein said applying step is implemented by a spining of said substrate.

5. The method of claim 1 wherein said electric field applying step is carried out by disposing said substrate between a pair of electrodes, and applying a voltage to said pair of electrodes.

* * * * *